(12) United States Patent
Paape

(10) Patent No.: US 7,071,413 B1
(45) Date of Patent: Jul. 4, 2006

(54) COVER ARRANGEMENT FOR PROTECTING ELECTRICAL SWITCHES AND OUTLETS DURING APPLICATION OF A COATING TO A SURROUNDING WALL AREA

(75) Inventor: Bruce S. Paape, Fredonia, WI (US)

(73) Assignee: Quikcap Labor Saver, Inc., Fredonia, WI (US)

( * ) Notice: Subject to any disclaimer, the term of this patent is extended or adjusted under 35 U.S.C. 154(b) by 0 days.

(21) Appl. No.: 10/889,884

(22) Filed: Jul. 13, 2004

Related U.S. Application Data

(60) Provisional application No. 60/486,823, filed on Jul. 14, 2004, provisional application No. 60/486,822, filed on Jul. 14, 2004, provisional application No. 60/479,876, filed on Jun. 20, 2003.

(51) Int. Cl.
 *H05K 5/03* (2006.01)
(52) U.S. Cl. .............................. 174/66; 174/67; 220/241
(58) Field of Classification Search .................. 174/66, 174/67; 220/241, 242, 477; 439/135; 70/63
See application file for complete search history.

(56) References Cited

U.S. PATENT DOCUMENTS

| | | | |
|---|---|---|---|
| 3,061,083 A | 10/1962 | Hubbell, Jr. | |
| 3,386,071 A | 5/1968 | Allen | |
| 4,250,349 A | 2/1981 | Bennett | |
| 4,293,173 A | 10/1981 | Tricca | |
| D279,860 S | 7/1985 | Schwalbe | |
| D297,396 S | 8/1988 | Schwalbe | |
| 4,822,650 A | 4/1989 | Horiki et al. | |
| 5,003,128 A * | 3/1991 | Grondin | ...................... 174/67 |
| 5,063,872 A | 11/1991 | Maus et al. | |
| 5,285,014 A | 2/1994 | Gilchrist | |
| D349,836 S | 8/1994 | Maggard | |
| 5,525,755 A | 6/1996 | Christensen | |
| 5,526,952 A | 6/1996 | Green | |
| 5,703,329 A | 12/1997 | Delone | |
| 5,723,816 A | 3/1998 | Neece | |
| D425,768 S | 5/2000 | Staley | |
| 6,103,974 A | 8/2000 | Erdfarb | |
| 6,317,995 B1 | 11/2001 | Hoffmann, Sr. | |
| 6,803,522 B1 * | 10/2004 | Skakun | ........................ 174/66 |

* cited by examiner

*Primary Examiner*—Dhiru R. Patel
(74) *Attorney, Agent, or Firm*—Boyle, Fredrickson, Newholm, Stein & Gratz, S.C.

(57) ABSTRACT

A cover arrangement for electrical switches and outlets includes a switch cover member and an outlet cover member. The switch cover member includes a planar masking wall and a mounting cavity configured to receive and frictionally engage a handle associated with a conventional electrical switch. An outlet cover member includes a masking wall in combination with a series of mounting walls that are configured to frictionally engage outwardly facing surfaces of an electrical outlet. The switch cover member and the outlet cover member may be packaged together.

10 Claims, 5 Drawing Sheets

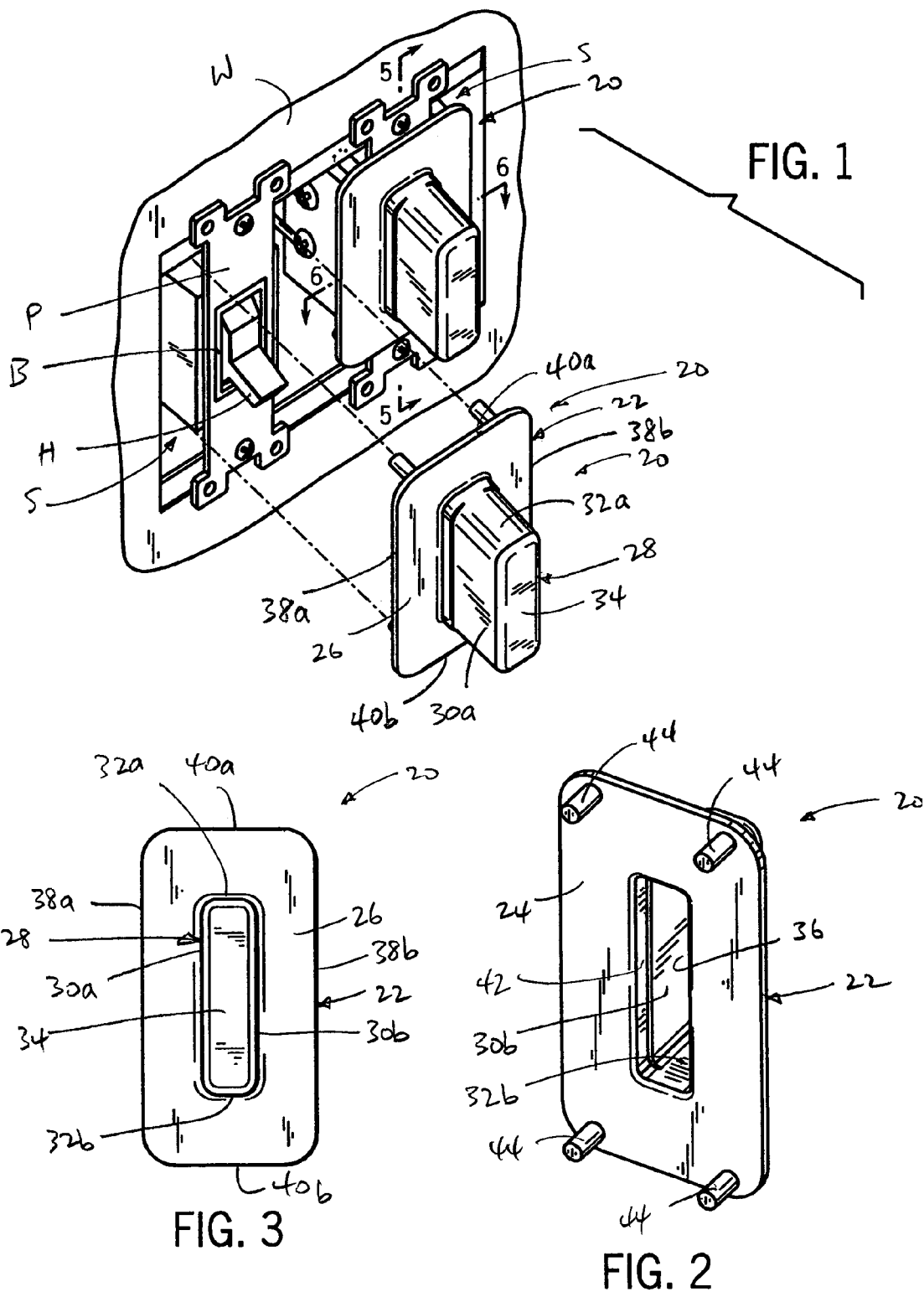

COVER ARRANGEMENT FOR PROTECTING ELECTRICAL SWITCHES AND OUTLETS DURING APPLICATION OF A COATING TO A SURROUNDING WALL AREA

CROSS-REFERENCE TO RELATED APPLICATION

This application claims the benefit of U.S. Provisional Application Ser. No. 60/479,876, filed Jun. 20, 2003; U.S. Provisional Application Ser. No. 60/486,822, filed Jul. 14, 2004; and U.S. Provisional Application Ser. No. 60/486,823, filed Jul. 14, 2004.

BACKGROUND AND SUMMARY OF THE INVENTION

This invention relates to application of a coating such as paint or plaster to a surface such as a wall, and more particularly to a cover arrangement for preventing application of the coating to electrical switches and outlets mounted in the wall.

Coatings such as plaster, paint or the like are typically applied to a wall, floor or ceiling after installation of electrical outlets and switches. During original construction, the coating is applied before the switch and outlet cover plates are installed. After original construction, the switch or outlet cover plates are typically removed during application of the coating. The exposed surfaces of the switch or outlet are typically covered with masking tape or the like during application of the coating, to ensure that the coating is not applied to the surfaces of the switch or outlet that will be exposed after installation of the cover plate. While this arrangement functions satisfactorily, application of the masking tape to the switch or outlet surfaces is a time consuming procedure, which is multiplied when the coating is being applied to a number of walls or other surfaces which include numerous switches and outlets.

It is an object of the present invention to provide a cover arrangement for preventing application of a coating such as plaster, paint or the like to exposed surfaces of electrical switches and outlets, in which a minimal amount of time and effort is required to cover the exposed switch and outlet surfaces. It is a further object of the invention to provide such a cover arrangement which utilizes distinct cover members that are configured to engage and cover the exposed switch and outlet surfaces. Yet another object of the invention is to provide such a cover arrangement which is relatively simple in construction, and thereby relatively inexpensive to produce and purchase in quantities required for normal use. Yet another object of the invention is to provide such a cover arrangement in which the cover members can be quickly and easily mounted to and removed from the electrical switches and outlets.

In accordance with the present invention, a cover arrangement for electrical switches and outlets includes a switch cover member configured for engagement with an electrical switch and an outlet cover member configured for engagement with an electrical outlet, to prevent application of a coating to exposed surfaces of the switches and outlets. The switch cover member and the outlet cover member may be packaged and sold together, or may be packaged and sold separately.

The switch cover member includes a generally planar masking wall, in combination with a mounting cavity that extends from the masking wall. The masking wall and the mounting cavity cooperate to cover the switch handle and the outwardly facing surfaces of the electrical switch. The mounting cavity is defined by a series of side walls and an end wall. Two of the mounting cavity side walls are spaced apart a distance that corresponds to the width of a conventional electrical switch handle. In this manner, the switch cover member is engaged with the electrical switch via push-on engagement of the switch handle with the side walls of the switch cover member mounting cavity. The side walls of the mounting cavity perform the dual function of engaging the switch handle to mount the switch cover member to the electrical switch, and providing a handle arrangement adapted to be manually engaged by a user for use in mounting the switch cover member to the electrical switch and removing the switch cover member from the electrical switch.

The outlet cover member includes a masking wall in combination with a series of inwardly extending mounting walls and an outwardly extending protrusion. The masking wall is configured to overlie the exposed areas of a conventional electrical outlet, and the protrusion is adapted to be manually engaged by a user for manipulating the cover member into and out of engagement with an electrical outlet. The inwardly extending mounting walls form a shallow cavity within which the prong-receiving portions of an outlet are engaged. The mounting walls are configured to engage the outer surfaces of the prong-receiving portions of the outlet, to provide a friction fit mounting of the outlet cover member to the outlet via application of a push-on force to the outlet cover member.

The outlet cover member and the switch cover member may be separately packaged and sold individually, or may be packaged and sold together, in various quantities as desired.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is an isometric view illustrating a pair of switch cover members in accordance with the present invention, for use in preventing application of a coating or the like to electrical switches mounted to a wall or other surface;

FIG. 2 is an isometric view illustrating one of the switch cover members of the present invention as shown in FIG. 1;

FIG. 3 is a front elevation view of one of the switch cover members of FIG. 2;

DETAILED DESCRIPTION OF THE INVENTION

Figure 4:
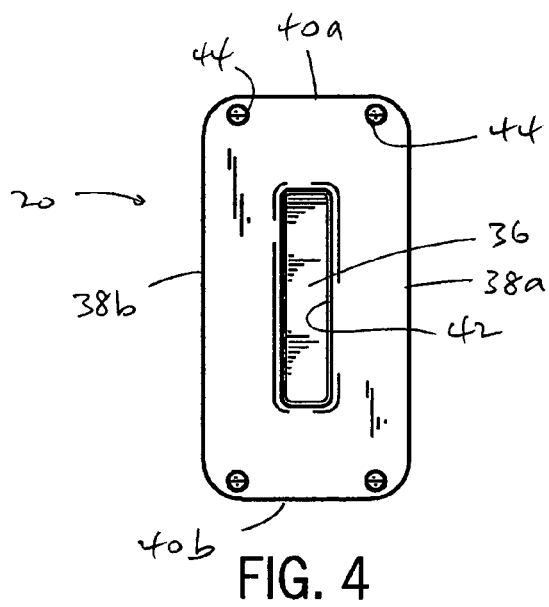
FIG. 4 is a rear elevation view of one of the switch cover members of FIG. 2.
Figure 5:
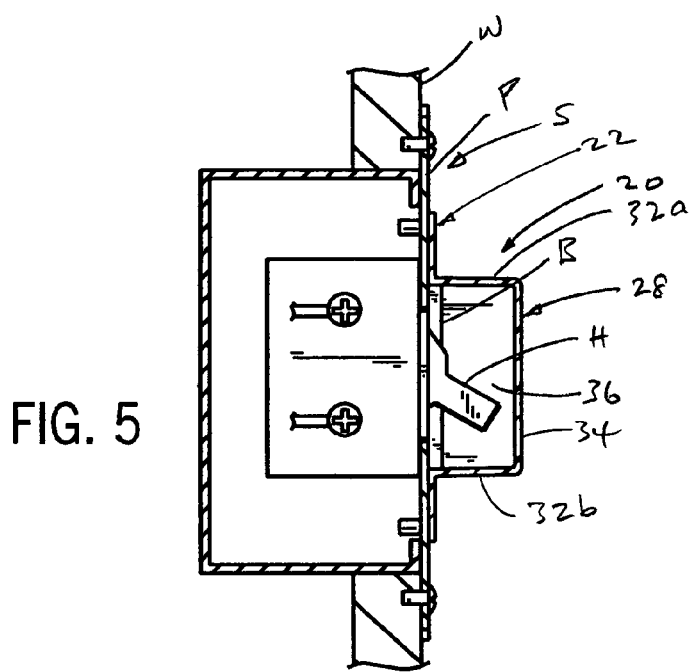
FIG. 5 is a partial section view taken along line 5—5 of FIG. 1.
Figure 6:
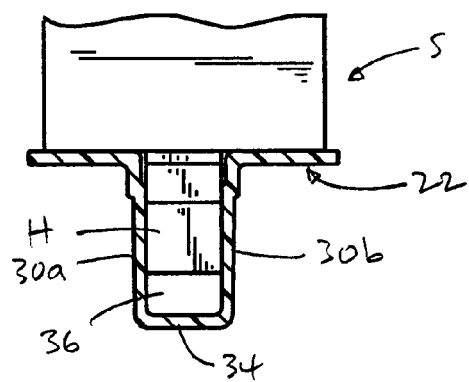
FIG. 6 is a partial section view taken along line 6—6 of FIG. 1.

Referring to FIG. 1, a pair of switch cover members 20 in accordance with the present invention are adapted for mounting to a pair of electrical switch assemblies S, which are mounted within a recess formed in a wall W in a manner as is known. Each switch cover member 20 is configured to prevent application of a coating such as plaster, paint or the like to a majority of an outwardly facing surface defined by each switch assembly S during application of the coating to wall W. In accordance with conventional construction, each switch assembly S includes an outwardly facing mounting or base plate P, which defines an opening through which a movable switch toggle or handle H extends. Switch cover member 20 is configured to prevent application of the coating to switch handle H, as well as to the adjacent areas of base plate P above and below the recess through which switch handle H extends.

Each switch cover member 20 includes a generally planar masking wall 22 defining an inwardly facing surface 24 and an outwardly facing surface 26. Each switch cover member 20 further includes a closed mounting projection 28 that extends from outwardly facing surface 26 of masking wall 22. Mounting projection 28 is defined by a series of side walls 30a, 30b and 32a, 32b, which are formed integrally with and extend outwardly from masking wall 22. The outer ends of side walls 30a, 30b and 32a, 32b are closed by an end wall 34, which is preferably integrally formed with side walls 30a, 30b and 32a, 32b. With this construction, side walls 30a, 30b and 32a, 32b cooperate with end wall 34 to define a mounting cavity 36 that opens onto inwardly facing surface 24 of masking wall 22.

Masking wall 22 is generally planar, and includes side edges 38a, 38b and end edges 40a, 40b, which cooperate to define the periphery of masking wall 22. It is understood that this configuration of masking wall 22 is representative of any number of different shapes that masking wall 22 may assume. In the illustrated embodiment, the rectangular shape of masking wall 22 includes rounded corners that extend between and interconnect the adjacent side and end edges. Masking wall 22 is configured to overlie a majority of the surface area of outwardly facing mounting or base plate P.

Referring to FIG. 2, mounting cavity 36 includes a widened entrance area 42 adjacent inwardly facing surface 24. Outwardly of entrance area 42, side walls 30a, 30b are spaced apart such that the inwardly facing surfaces of side walls 30a, 30b are closer together than at entrance area 42.

A series of projections 44 extend from inwardly facing surface 24 of masking wall 22. Projections 44 are used in injection molding of switch cover member 20.

In use, switch cover member 20 is engaged with an electrical switch assembly S by positioning cover member 20 such that mounting cavity 36 is in alignment with handle H of switch assembly S. Using mounting projection 28, switch cover member 20 is then moved toward switch assembly S such that switch handle H passes through entrance area 42 of mounting cavity 36 and masking wall 22 is advanced toward the outwardly facing surfaces of switch assembly S adjacent handle H. Side walls 30a, 30b are spaced apart such that the facing inner surfaces of side walls 30a, 30b engage the side surfaces of switch handle H, after switch handle H passes through entrance area 42 of mounting cavity 36. This frictional engagement of side walls 30a, 30b with switch handle H functions to maintain switch cover member 20 in releasable engagement with switch assembly S. Switch cover member 20 is advanced until masking wall 22 engages the outwardly facing surfaces of switch assembly S adjacent switch handle H, as shown in FIG. 1, and is left in place while the coating is applied to the area of wall W around switch assembly S. During installation of switch cover member 20, entrance area 42 of mounting cavity 36 receives a conventional border B that extends outwardly from the outwardly facing surfaces of switch assembly S. When it is desired to remove switch cover member 20, the user manually grasps side walls 30a, 30b or 32a, 32b of mounting projection 28 and applies an outward force, which disengages the side edges of switch handle H from the facing inner surfaces of side walls 30a, 30b.

FIGS. 7–12 illustrate a pair of outlet cover member 50 in accordance with the present invention. Outlet cover members 50 are adapted for mounting to a pair of electrical outlets OL, which are mounted within a recess formed in wall W in a manner as is known. Each outlet cover member 50 is configured to prevent application of a coating such as plaster, paint or the like to an outwardly facing surface defined by each outlet OL during application of the coating to wall W. In accordance with conventional construction, each outlet OL includes an outwardly facing mounting or base plate P, to which a pair of plug-receiving sections are mounted, in a manner as is known. Outlet cover member 20 is configured to prevent application of the coating to the plug-receiving areas of outlet OL, as well as to exposed areas of base plate P between the plug-receiving areas of outlet OL.

Outlet cover member 50 includes a masking wall 52 that defines an inwardly facing surface 54 and an outwardly facing surface 56. A series of mounting walls extend inwardly from inwardly facing surface 54 of masking wall 52, and include side mounting walls 58a, 58b and end mounting walls 60a, 60b. In addition, outlet cover member 50 includes a handle section 62 that extends outwardly from outwardly facing surface 56 of masking wall 52. Handle section 62 is defined by a series of side walls 64a, 64b and 66a, 66b, in combination with an outer wall 68, which cooperate to define an internal cavity 70.

Side mounting walls 58a, 58b and end mounting walls 60a, 60b define the outer extent of the periphery of outlet cover member 50. Side mounting walls 58a, 58b and end mounting walls 60a, 60b extend perpendicularly to masking wall 52, and are preferably integrally formed with masking wall 52.

A series of ribs 72 are formed on each of side mounting walls 58a, 58b, extending inwardly from the inner surface of each mounting wall. The ribs 72 are formed to define two spaced apart pairs of ribs 72, with a single rib 72 located between the spaced apart rib pairs. Each rib 72 extends between the edge of its associated side mounting wall 58a or 58b, and the inwardly facing surface 54 of masking wall 52. With this construction, masking wall 52 and side and end mounting walls 58, 60, respectively, cooperate to define a shallow cavity.

Figure 7:
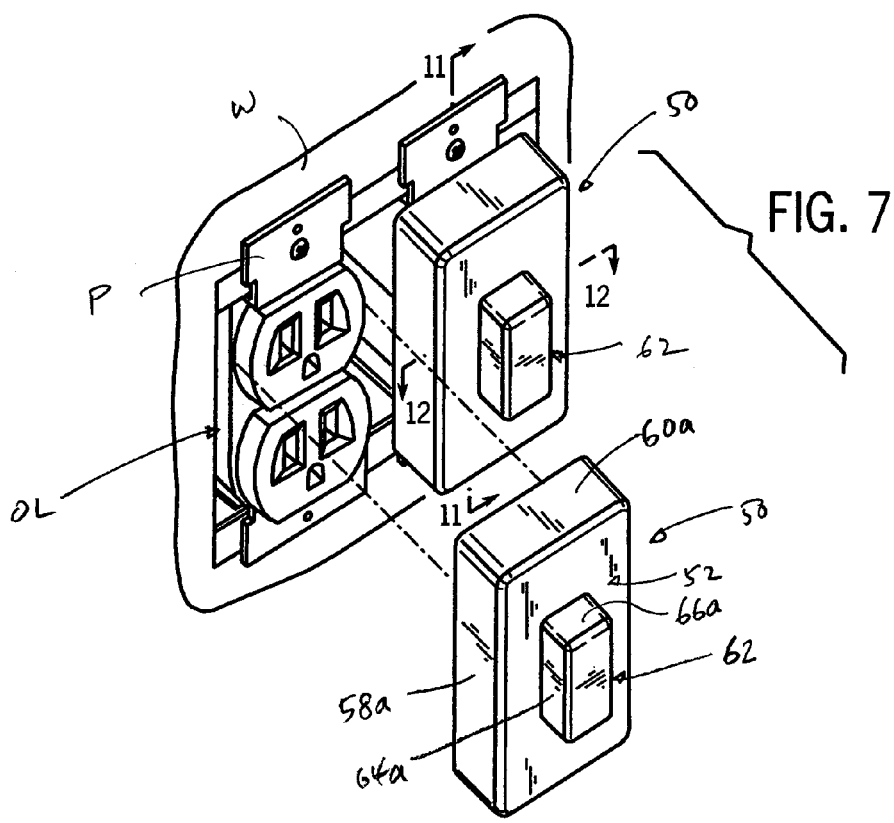
FIG. 7 is an isometric view illustrating a pair of outlet cover members in accordance with the present invention, for use in preventing application of a coating or the like to a electrical outlets mounted to a wall or other surface.
Figure 9:
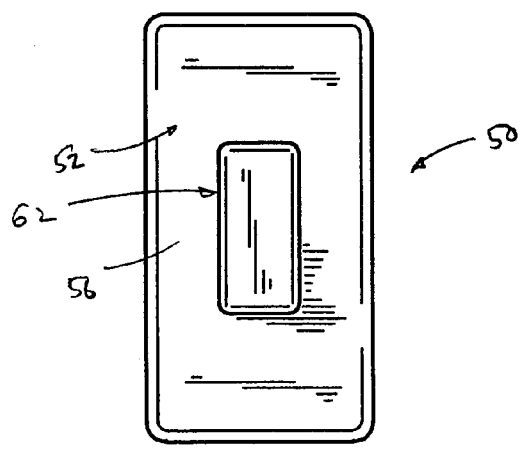
FIG. 9 is a front elevation view of one of the outlet cover members of FIG. 8.
Figure 8:
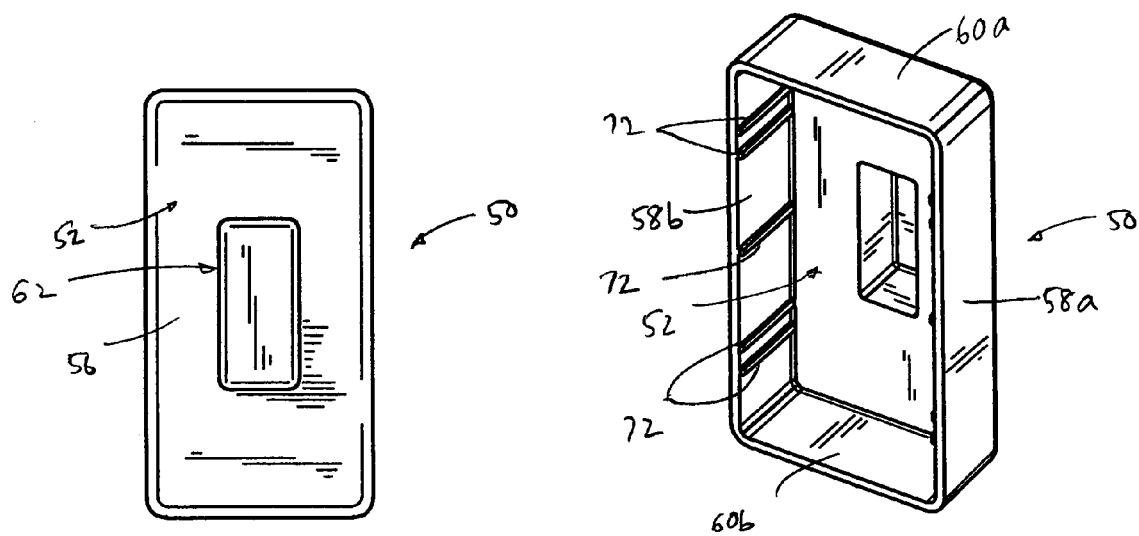
FIG. 8 is an isometric view illustrating one of the outlet cover members of the present invention as shown in FIG. 7.
Figure 10:
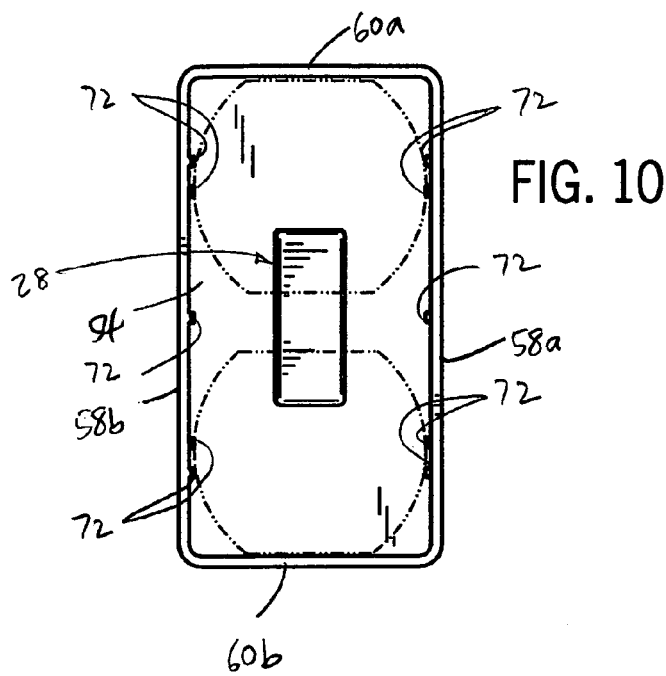
FIG. 10 is a rear elevation view of one of the outlet cover members of FIG. 8.
Figure 11:
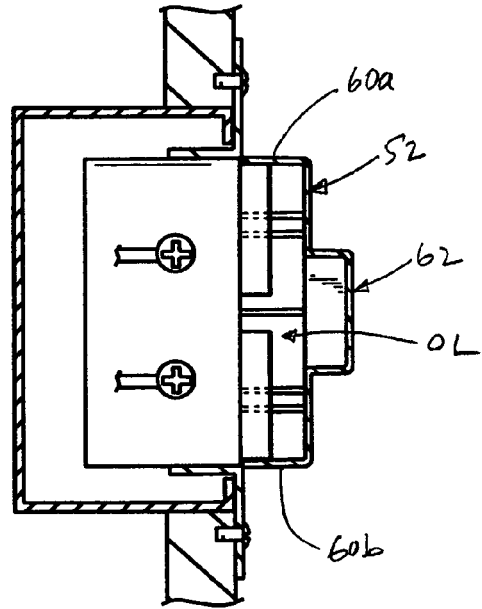
FIG. 11 is a partial section view taken along line 11—11 of FIG. 7.
Figure 12:
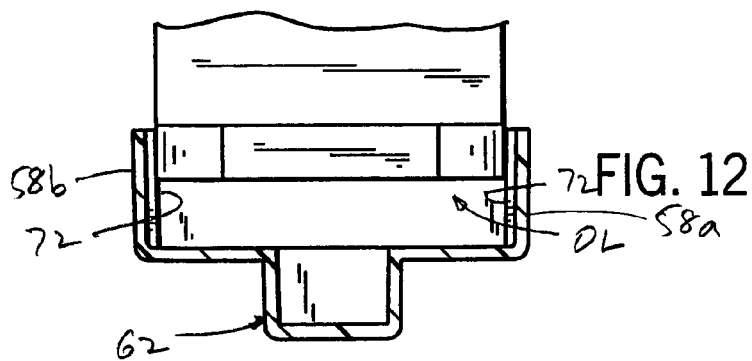
FIG. 12 is a partial section view taken along line 12—12 of FIG. 7.

In use, outlet cover member 50 is installed over electrical outlet OL by grasping handle section 62 and applying a push-on force so as to move outlet cover member 50 toward and into engagement with outlet OL. Side mounting walls 58a, 58b are spaced apart a distance that is slightly greater than the width defined by the maximum transverse dimension of outlet OL, which is formed by the outwardly facing surfaces of the plug-receiving sections of outlet OL. Ribs 72 are positioned so as to be located one on either side of the center of the arcuate surface defined by each plug-receiving section of outlet OL. End mounting walls 60a, 60b are spaced apart a distance only slightly greater than the top-to-bottom height defined by the plug-receiving sections of outlet OL. In this manner, end mounting walls 60a, 60b function to establish the location of ribs 72 relative to the areas of outlet OL that are intended to be engaged by ribs 72. Continued push-on force applied to outlet cover 50 results in a frictional engagement between ribs 72 and the adjacent surfaces of outlet OL, to retain outlet cover 50 in position on outlet OL as shown in FIG. 7. Outlet cover member 50 is left in place while the coating is applied to the surfaces of wall W adjacent outlet OL, after which the user grasps handle section 62 and applies an axial outward force to disengage outlet cover 50 from outlet OL.

Ribs 72 may have a tapered configuration, so as to increase in height in an outward-to-inward direction, to facilitate engagement with the side surfaces of the plug-receiving sections of outlet OL.

Outlet cover 50 may also be used to cover a decora-style electrical switch, which includes a low profile toggle in place of a switch handle H as shown in FIGS. 1–6. The width of a switch of this type corresponds to the width of the plug-receiving areas of outlet OL, which enables outlet cover 50 to be used to cover the exposed areas of a the switch during application of a coating to the surrounding wall area.

Figure 13:
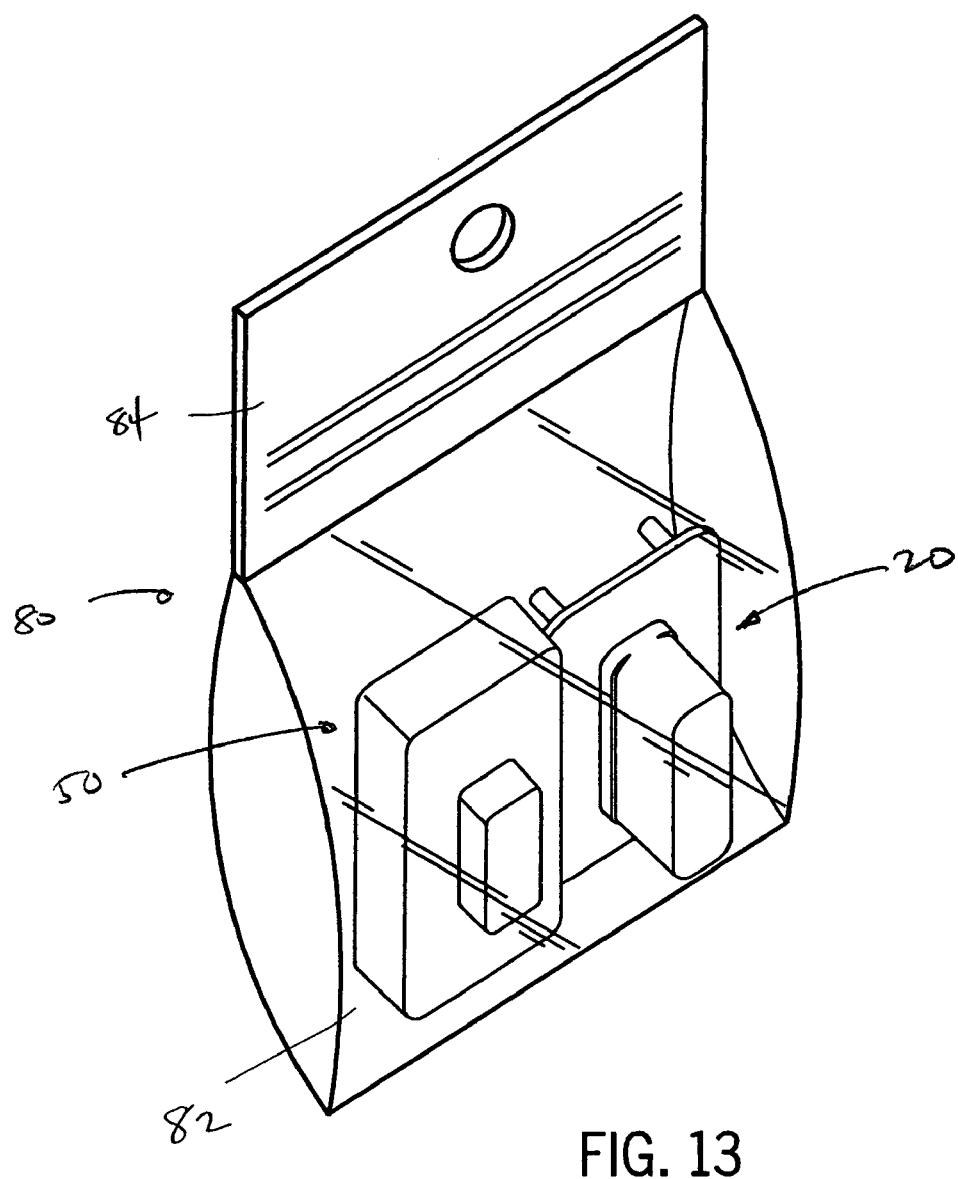
FIG. 13 is an isometric view illustrating one embodiment of an arrangement in which a switch cover member as in FIG. 2 and an outlet cover member as in FIG. 8 are packaged together.

FIG. 13 illustrates an arrangement in which a pair of cover members, in the form of a switch cover member 20 and an outlet cover member 50, are packaged together in a package 80 that includes a product cavity 82 within which cover members 20, 50 are contained, and a closure member 84 that functions to maintain the cover members within the interior of the package and to suspend the package for display. With this arrangement, a user is able to purchase cover members 20, 50 together, and to selectively use a desired one or both of cover members 20, 50 when desired. It should be understood that the packaging arrangement of FIG. 13 is illustrative of any number of types of packaging arrangements by may be employed to package cover members 20 and 50 together. In addition, it is understood that any number of cover members 20 and 50 may be packaged together, and not necessarily one of each.

Various alternatives and embodiments are contemplated as being within the scope of the following claims particularly pointing out and distinctly claiming the subject matter regarded as the invention.

I claim:

1. A cover arrangement for preventing application of a coating to wall-mounted electrical switches and outlets, comprising:

a switch cover member having a switch masking wall and a cavity, wherein the cavity is defined by at least a pair of spaced apart walls that are configured to receive and releasably engage side surfaces of a linearly movable switch handle associated with an electrical switch to engage the switch cover member with the switch, and wherein the switch masking wall is configured to overlie outwardly facing areas of the electrical switch located adjacent the switch handle; and an outlet cover member having a outlet masking wall and a series of mounting walls configured to engage side surfaces of an electrical outlet for releasably securing the outlet cover member to the electrical outlet, wherein the outlet masking wall is configured to overlie outwardly facing areas of the electrical outlet located inwardly of the side surfaces of the electrical outlet, wherein the mounting walls include ribs configured for engagement with the outwardly facing areas of the electrical outlet.

2. The cover arrangement of claim 1, wherein the masking wall of the switch cover member is generally planar and terminates in a periphery, and wherein the periphery of the masking wall lies in the plane of the masking wall and defines the outer extent of the switch cover member.

3. The cover arrangement of claim 2, wherein the pair of spaced apart walls are defined by a series of side walls that extend outwardly from the switch masking wall and that cooperate to form the cavity, in combination with an end wall that extends between and interconnects the side walls.

4. The cover arrangement of claim 1, wherein the outlet masking wall of the outlet cover member is generally planar and is configured to overlie outwardly facing areas of the electrical outlet located inwardly of the side surfaces of the electrical outlet, and wherein the outlet cover member includes a handle member extending from the outlet masking wall in an opposite direction from the mounting walls, wherein the handle member is configured for manual engagement by a user and is incapable of engagement with the switch handle associated with the electrical switch.

5. The cover arrangement of claim 1, wherein the handle member comprises a series of walls extending from the masking wall that cooperate to define a cavity.

6. The cover arrangement of claim 1, further comprising a packaging arrangement for packaging the switch and outlet cover members together.

7. A method of preventing application of a coating to wall-mounted electrical switches and outlets, comprising the acts of:

providing a switch cover member having a switch masking wall and a cavity, wherein the cavity is defined by at least a pair of spaced apart walls that are configured to receive and releasably engage sides surfaces of a linearly movable switch handle associated with an electrical switch, and wherein the switch masking wall is configured to overlie outwardly facing areas of the electrical switch located adjacent the switch handle;

providing an outlet cover member having an outlet masking wall and a series of mounting walls configured to engage side surfaces of an electrical outlet for releasably securing the outlet cover member to the electrical outlet, wherein the outlet masking wall is configured to overlie outwardly facing areas of the electrical outlet located inwardly of the side surfaces of the electrical outlet; wherein the mounting walls include ribs configured for engagement with the outwardly facing areas of the electrical outlet, selectively securing the switch cover member to the electrical switch by engaging the side surfaces of the switch handle with the pair of spaced apart walls defining the cavity of the switch cover member, and selectively securing the outlet cover member to the electrical outlet by engaging the mounting walls of the outlet cover member with the side surfaces of the electrical outlet.

8. The method of claim 7, wherein the act of securing the switch cover member to the electrical switch is carried out such that the switch masking wall covers only the outwardly facing areas of the electrical switch located adjacent the switch handle.

9. The method of claim 7, wherein the act of securing the outlet cover member to the electrical outlet is carried out by manipulating the outlet cover member using a handle that extends outwardly from the masking wall in a direction opposite the mounting walls, wherein the handle of the outlet cover member is configured for manual engagement by a user and is incapable of engagement with the switch handle associated with the electrical switch.

10. The method of claim 7, further comprising the act of packaging the switch and outlet cover members together.

* * * * *